Oct. 6, 1964   H. M. HOLMES   3,151,393
DENTAL IMPRESSION TAKING DEVICE
Filed May 27, 1963
FIG_1
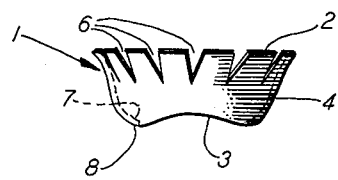
FIG_2
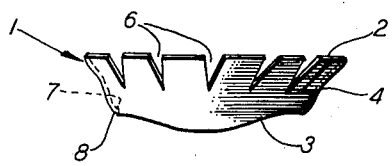
FIG_3
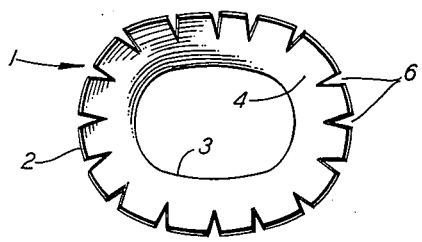
FIG_4
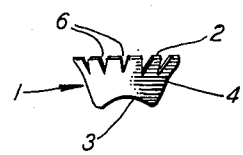
FIG_5
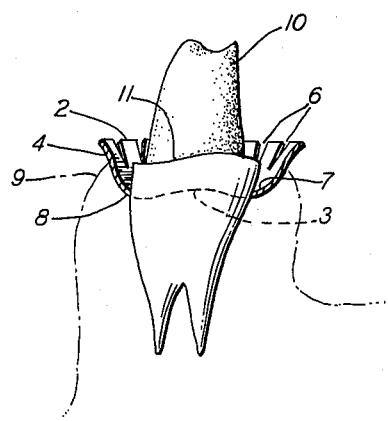
FIG_6
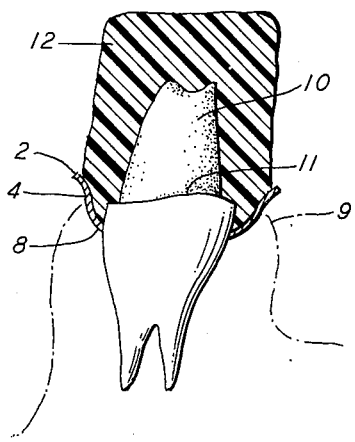
INVENTOR.
HILLARD M. HOLMES
BY
Boykin, Mohler + Foster
ATTORNEYS

United States Patent Office 3,151,393
Patented Oct. 6, 1964

3,151,393
DENTAL IMPRESSION TAKING DEVICE
Hillard Myron Holmes, Box 26, Kings Beach,
Lake Tahoe, Calif.
Filed May 27, 1963, Ser. No. 283,239
8 Claims. (Cl. 32—17)

This invention relates to a device for use in taking temporary dental impressions for use in making permanent crowns, overlays and inlays.

It is an object of this invention to provide a method for taking dental impressions whereby a complete impression of a prepared tooth, including sub-gingival portions thereof, can be taken.

It is another object of this invention to provide a method for taking dental impressions whereby the portions of the tooth of which the impression is being taken is exposed to visual and physical access.

It is still another object of this invention to provide a method of taking dental impressions whereby congealable impression material can be built-up around a prepared tooth and, when congealed, can be removed from said tooth independently of any form, mold, sleeve or other type of encasement.

Another object of this invention is to provide a device for use in taking dental impressions which will allow a complete impression to be taken of a prepared tooth including portions thereof which are below the gum line of said tooth.

Still another object of this invention is to provide a device for use in taking dental impressions which will allow air that may be entrapped by the impression material to escape from said device yet which will prevent the impression material from escaping from the device into the sub-gingival crevice.

Yet another object of the present invention is to provide a dental impression device which will permit the impression material to be removed from a tooth independently of said device after the impression is taken.

It is yet another object of this invention to provide a dental impression taking device which is adapted to encircle the sub-gingival portion of a tooth and which is so constructed as to not injure the gingiva around such tooth.

It is still another object of the present invention to provide a dental impression taking device which is readily deformable to the external contour of a tooth on which it may be used.

Another object of this invention is the provision of a device for use in taking the dental impression of a tooth and which is relatively small compared to the size of devices used heretofore in taking similar impressions.

Other objects and advantages of this invention will be apparent from the description and from the drawing.

In the drawing, FIG. 1 is an end elevational view of the device of this invention.

FIG. 2 is a side elevational view of the device of FIG. 1.

FIG. 3 is a top plan view of the device of FIG. 1.

FIG. 4 is an end elevational view of a device similar to that of FIG. 1, only of a smaller size.

FIG. 5 is a cross-sectional view through the gingiva around a prepared tooth, the device of this invention being shown in cross-section in position in relation to said tooth and said gingiva.

FIG. 6 is a view similar to that of FIG. 5 after impression material has been placed over said device and around said tooth.

As is illustrated in FIGS. 1 and 2, the device of this invention is in the form of a cup-like collar 1 having an upper edge 2 and a lower edge 3 and an upwardly and outwardly diverging sidewall 4. Thus the collar 1 is generally conical in shape and is centrally open at edges 2, 3 of said sidewall.

In using the terms "upper" and "upwardly" and "lower" and "downwardly" and terms of similar meaning herein, reference is made to the crown of a tooth as being the upper end of a tooth and the root of a tooth as being the lower end thereof without regard to the position of the tooth within the mouth of a person.

Opening upwardly and outwardly of upper edge 2 of collar 1 is a row of openings 6, preferably V-shaped slots, around the circumference of said collar. The sides or edges of said slots 6 converge downwardly and terminate on a line intermediate edges 2 and 3. When collar 1 is in use slots 6 provide escape openings for entrapped air, as will be described later in greater detail.

The lower edge 3 of collar 1 is festooned or curved as illustrated in FIGS. 1 and 4. Marginal gingiva extends around a tooth in an uneven line and the interproximal gingiva normally projects higher on the neck or extends further toward the crown of a tooth than the buccal and lingual gingiva. Thus, edge 3 of collar 1 is festooned or curved to generally follow this uneven contour of the marginal gingiva around the neck of a tooth. Further, the interproximal gingiva normally projects higher on the neck of a smaller tooth than it does on a larger tooth. Thus, in collars adapted to fit smaller teeth, edge 3 is normally festooned to a greater degree, as seen in FIG. 4.

A marginal portion 7 of sidewall 4, adjacent the lower edge 3 thereof may extend radially inwardly of that portion of sidewall 4 immediately thereabove. When a collar is positioned around a prepared tooth this inwardly extending marginal portion 7 provides a rounded, generally downwardly, facing surface 8 in engagement with the gingiva adjoining the tooth which considerably reduces the possibility of the device cutting or otherwise injuring the gingiva around the tooth during positioning of the device on the latter and the surface 8 of marginal portion 7 gently spreads the marginal gingiva from around a sub-gingival portion of the tooth, and marginal portion 7 spaces sidewall 4 radially outwardly of both the sub-gingival and prepared portions of the tooth.

In making the device of this invention collar 1 is made of a readily deformable material that will remain in the shape into which it is deformed. A different standard collar cannot, as a practical matter, be made for every tooth, so a collar of general shape is provided and this is deformed to follow the external contour of the particular tooth on which it is to be used. While copper may generally be used in manufacturing devices of the type herein described, it is to be understood that other metals as well as plastics may also be used.

Teeth also differ greatly in size. The device of this invention can be conveniently and economically made in a wide range of sizes which may vary, in inside diameter, from approximately four millimeters to approximately twelve millimeters.

The number of openings 6 around the upper edge 2 of collar 1 can be varied, but there should be enough openings 6 to provide a sufficient number of escape passages for entrapped air. It has been found desirable to space slots 6 by approximately two to three millimeters which will allow the material of collar 1 between said slots to be sufficiently yieldable.

In axial height, collar 1 is preferably relatively short compared to prior art devices and must be short in order to practice the method of taking dental impressions to be described herein. Collars of approximately one-eighth of an inch in height have been found to be particularly adaptable to practicing the method of this invention.

It should be noted that the portion of collar 1 between the terminating lower ends of openings 6 and the lower edge 3 of said collar is imperforate. This precludes the possibility of depositing impression material in a tooth socket where it might remain after the collar has been removed, thereby causing discomfort and even infection.

In using the device and practicing the method of this invention, the example of repairing a tooth by crownwork will be used. The prepared portion 10 (FIG. 5) of the tooth is that portion which is effected by grinding and of which an impression is to be taken. In grinding away a portion of the tooth a shoulder 11 may be formed, which shoulder may be below the gum line of the tooth. The marginal gingiva 9 around shoulder 11 will tend to close around said shoulder thus obstructing visual and physical access to that area.

In order to insure an even and clean line of departure between a permanent crown and the sub-gingival surfaces of the tooth it is necessary to have an accurate impression of the shoulder 11 as well as the sub-gingival surfaces of the tooth below and adjoining said shoulder. Thus it is necessary in many cases that the impression of the tooth be made below the gum line.

To make such an impression the marginal gingiva must be spread away from a sub-gingival portion of the tooth and must be held spaced radially outwardly of said sub-gingival portion while an impression is being taken. To accomplish this a collar 1 of appropriate size, as determined by the inside diameter thereof, is positioned over the prepared portion 10 and the shoulder 11 of a tooth. Being made of readily deformable material, the collar 1 is shaped to the particular tooth as it is being positioned therearound.

The rounded leading surface 8 of collar 1, as the collar is moved downwardly, engages the marginal gingiva and gently spreads said gingiva away from the tooth without cutting or injuring it. It can be seen that if the surface 8 of collar 1 were flat and coplanar it would engage the higher, interproximal gingiva first and by the time the buccal and lingual gingiva was properly spread away from the sub-gingival portion of the tooth, the interproximal gingiva would be disproportionately spread. To avoid this the lower edge 3 and the marginal portion adjoining it are festooned and the interproximal, buccal, and lingual gingiva are engaged by surface 8 at substantially the same time and are uniformly spread from around the tooth.

When collar 1 is properly positioned it extends below the gum line with edge 3 in substantial engagement with the outer surfaces of the tooth along a line around the sub-gingival portion thereof.

Radially inwardly extending lower marginal portion 7 spaces sidewall 4, and therefore the marginal gingiva engaged thereby, radially outwardly of the prepared and sub-gingival portions of the tooth. The upper edge 2 of collar 1 preferably extends only slightly above the gum line and the surrounding gingiva relative to the normal height of the tooth that is to be crowned which is the height to which the crown will extend.

Collar 1 being properly positioned, the congealable impression material is then applied. Several impression materials used in dentistry are suitable for use in practicing the method of this invention, a few of which are known as: Hydrocoloid; rubber base; silicones; and alginates. Characteristic of these suitable materials is the fact that they are self-supporting in that they will not slump or freely flow. They can be built up around a prepared tooth without having a rigid sleeve or casing around the sides thereof for support during setting or congealing.

In forming the impression of the prepared tooth, collar 1 is used as a foundation or base upon which the impression is built. The impression material is applied into the space between the prepared tooth and the collar filling said space. As seen in FIG. 6 the impression 12 extends below the lowest prepared portion 10 of the tooth and will reproduce an accurate impression of the surfaces of the sub-gingival portion of the tooth. None of the impression material is allowed to escape into the tooth socket. The imperforate lower portion of collar 1 maintains effective separation between the impression material and the surrounding gingiva. Any air which might be entrapped within collar 1 when the impression material is filled therein and which would result in an imperfect impression escapes through openings 6. The impression material is built up until it completely encases the prepared and exposed sub-gingival portions of the tooth. While the impression is being formed, the dentist will have complete visual and physical access to the area on which he is working since the collar 1 is generally conical in shape and does not extend a substantial distance upwardly along the sides of the tooth.

After the impression is formed, the material is allowed to set or congeal. When the impression material has congealed or set it may be manually removed from the tooth by gentle force from the fingers of the dentist. No special tool and no excessive force is required which would be likely to damage or distort the impression. The impression material is normally removed independently of the collar 1, which collar remains in place on the tooth. This is important.

After the impression is removed the collar may be removed by using whatever force and tools are necessary without risking injury to the impression. After the collar is removed the marginal gingiva returns to its normal position around the sub-gingival portion of the tooth.

It can be seen that by practicing the method of taking dental impressions disclosed herein a complete impression free from such defects as air bubbles is obtained. The impression is not only of the prepared portion of the tooth but also of the area adjacent thereto to insure a properly fitting permanent repair. The dentist can see the impression material at the critical points as it is applied. The impression is not impaired when the material is being removed from the tooth. The marginal gingiva around the tooth being repaired is spread and held spaced outwardly of the sides of the tooth throughout the operation and is not allowed to return to its normal position until after the material having the impression therein is removed.

Use of the device disclosed herein allows an impression to be taken below the gum line and of portions of the tooth adjacent to the prepared portion. The device permits visual and physical access to the area being repaired at all times. Further, the device provides for the escape of harmful air bubbles and prevents depositing any of the impression material into the tooth socket. The device is so constructed as to not injure the gingiva surrounding a tooth, and to allow removal of the impression from the tooth independently of the removal of said device.

The above detailed description is not intended to be restricting as means for practicing the method herein disclosed may occur to those skilled in the art which do not depart from the spirit of this invention or from the scope of the appended claims.

For example, the slot 6, while referred to as "V-shaped" slots, may be U-shaped, and it is understood that where "V-shaped" is used, it is intended to include and to cover U-shaped slots.

I claim:
1. A device for use in taking dental impressions, comprising:
   (a) a centrally open, cup-like collar having an upwardly diverging generally conically shaped sidewall terminating in an upper edge and a substantially continuous lower edge and including an imperforate marginal portion along said lower edge;
   (b) said lower edge having a linear contour adapted to substantially engage the outer surfaces of a tooth along a generally horizontal line around the sub-gingival portion thereof;
   (c) said sidewall being formed with a row of openings having lower ends terminating on a line intermediate said upper and lower edges to permit escape of air within said collar through said lower ends upon filling the space between said sidewall and said tooth with impression materal.

2. The device of claim 1, in which:
   (d) said collar is made of a thin, sheet-like material which is adapted to be readily deformed to follow the external contour of a tooth and to remain in the deformed shape.

3. The device of claim 1, in which:
   (d) said openings opening outwardly of said upper edge.

4. The device of claim 1, in which:
   (d) said lower edge of said collar is festooned to generally follow the contour of the interproximal gingiva when said collar is around a tooth.

5. The device of claim 1, in which:
   (d) said collar is axially short relative to the height of a normal tooth.

6. A device for use in taking dental impressions, comprising:
   (a) a centrally open collar having an upwardly diverging sidewall adapted to extend around a tooth to a substantially uniform height, which sidewall terminates in an upper and a lower edge;
   (b) said lower edge being adapted to substantially engage the outer surfaces of a tooth along a line around the sub-gingival portion thereof;
   (c) said sidewall being formed with a row of upwardly opening V-shaped slots having their closed lower ends terminating on a line intermediate said upper and lower edges and their upper ends opening outwardly of said upper edge.

7. The device of claim 6, in which:
   (d) the lower marginal portion of said collar extends radially inwardly relative to the portion of said sidewall thereabove in order to spread the gingiva from around said tooth when said collar is positioned therearound to thereby expose the prepared portion of said tooth above said lower edge.

8. The device of claim 6, in which:
   (d) said upper edge projects only slightly above the gingiva surrounding said tooth when said collar is in position for taking an impression.

References Cited in the file of this patent
UNITED STATES PATENTS 2,428,689   Sykes  ---------------- Oct. 7, 1947
2,958,946   Chertkof  ------------- Nov. 8, 1960